Figure 1:
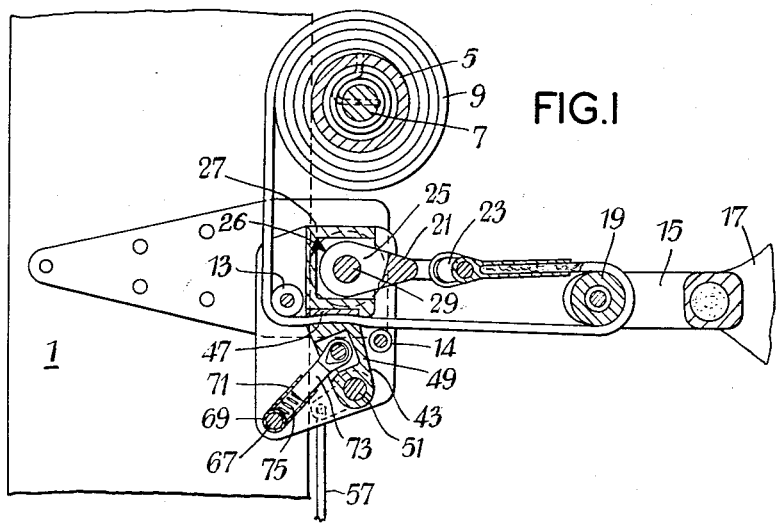

Feb. 14, 1961 J. MARTIN 2,971,730
AIRCRAFT EJECTION SEATS
Filed Dec. 17, 1957

Feb. 14, 1961   J. MARTIN   2,971,730
AIRCRAFT EJECTION SEATS
Filed Dec. 17, 1957   6 Sheets-Sheet 2
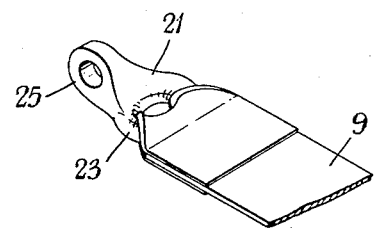
FIG.3
FIG.4
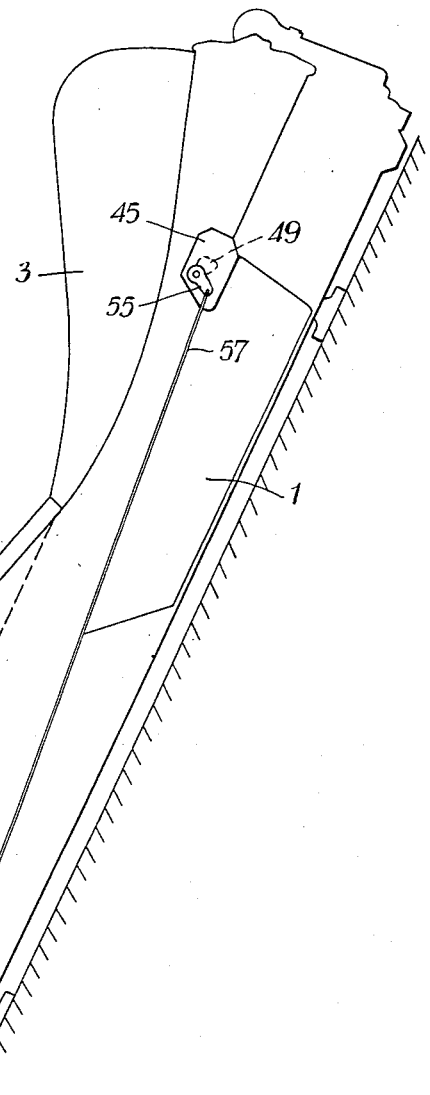

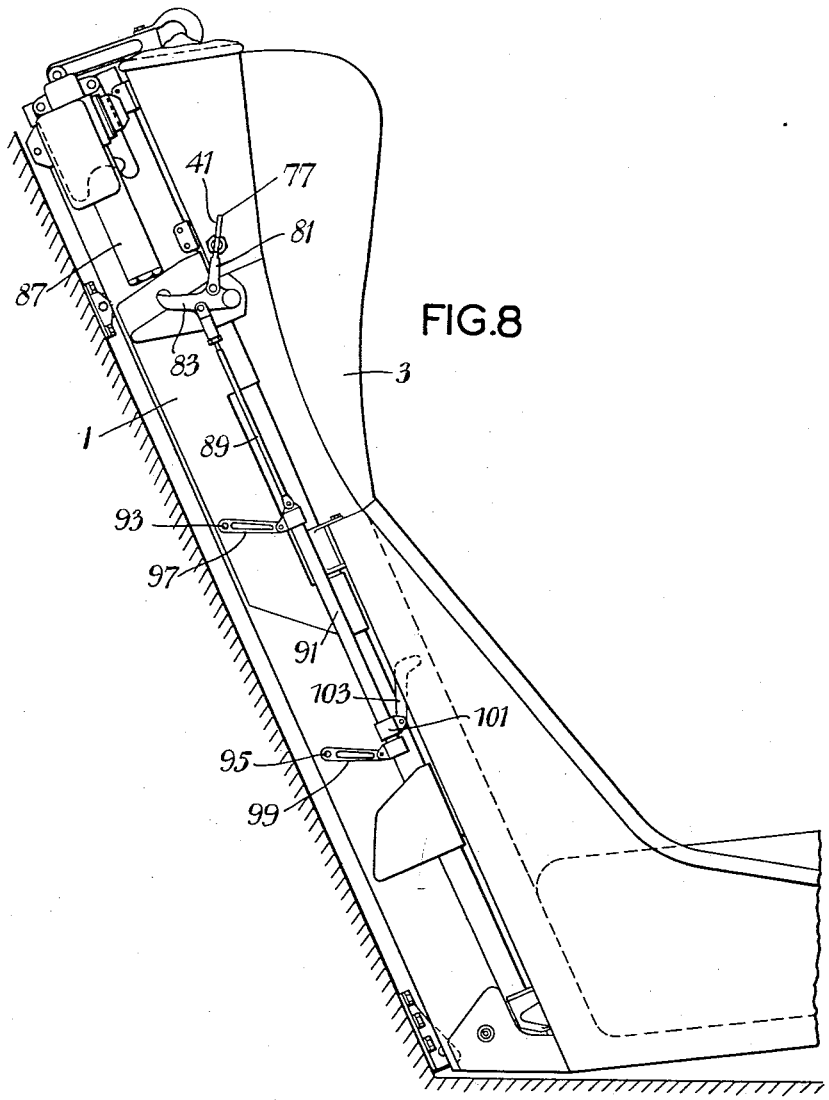

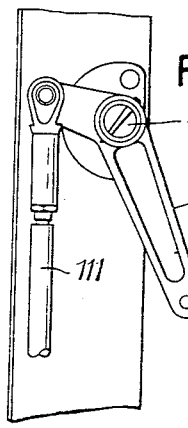
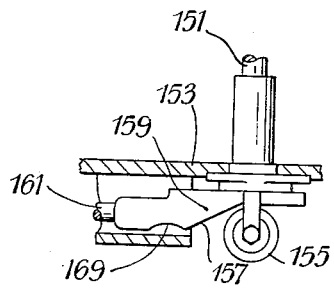
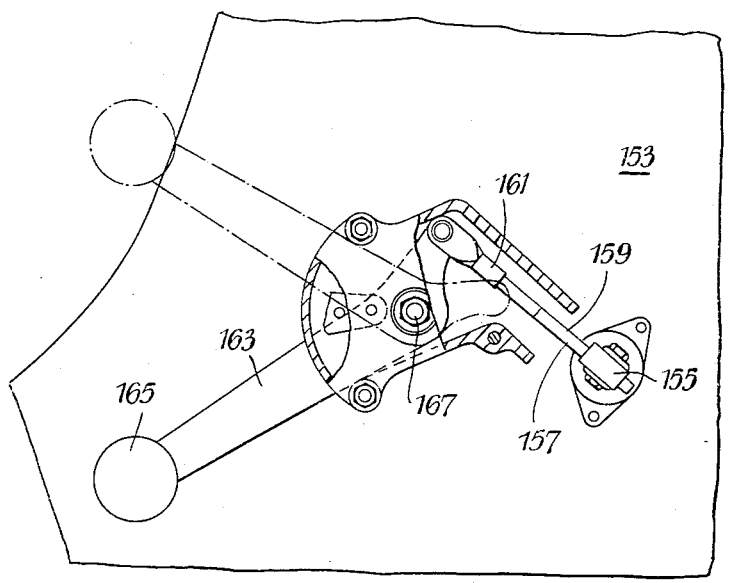

United States Patent Office 2,971,730
Patented Feb. 14, 1961

2,971,730
AIRCRAFT EJECTION SEATS
James Martin, Southlands Manor, Southlands Road, Denham, near Uxbridge, Middlesex, England
Filed Dec. 17, 1957, Ser. No. 703,405
Claims priority, application Great Britain Dec. 21, 1956
3 Claims. (Cl. 244—122)

This invention relates to aircraft ejection seats. More particularly, the invention relates to such a seat of the kind which is adapted to be launched from an aircraft with an occupant seated therein and in which mechanism is provided by which the seat is launched from the aircraft by means of an ejection unit actuated by an applied force, for example, by pressure generated by explosive cartridge means.

The occupant of such a seat is usually provided with a body harness comprising an arrangement of straps which are primarily intended to form a cradle for the support of the seat occupant during a parachute descent, the parachute being secured to the body harness by means of suitable extensions of the straps thereof. In addition, the seat occupant is usually secured in the seat by means of seat harness which generally comprises an arrangement of straps secured at their rear ends to locks on the seat and passing around the body of the seat occupant, e.g. over the shoulders and around the waist of the latter, and being secured at their forward ends in front of the seat occupant, for example, in a quick release box on his body harness. Thus the seat harness generally includes straps which are releasably secured to the seat and pass respectively over the shoulders of the seat occupant and are each secured in front of the seat occupant to an appropriate part of the body harness of the occupant. With such an arrangement, if the occupant of the seat wishes to lean forward he can do so only by loosening the shoulder straps of the seat harness. Frequent loosening and tightening of these shoulder straps as may be required during flight becomes tedious for the occupant of the seat and it is an object of the present invention to provide an ejection seat of the kind set forth wherein simple and effective means are provided for making connection between the ejection seat and the seat harness of the seat occupant so that forward leaning of the occupant relative to the seat can readily be achieved.

Viewed from one aspect the present invention provides an aircraft ejection seat of the kind set forth, having means for coupling a seat harness of an occupant of the seat to the seat, such means comprising: a rotatable drum mounted on the seat; a flexible member wound on said drum and having a first end connected to the latter; spring means connecting said drum to the seat and tending to rotate the drum to wind the flexible member on to the latter; apertured link means on the said seat harness, the second end of said flexible member extending forwardly from the drum and passing freely through said apertured link means and thence rearwardly to the seat; locking means on the seat for releasably securing said second end of the flexible member of the seat; release mechanism connected to said locking means for actuating the latter to release the flexible member therefrom; holding means on said seat engaging said flexible member to inhibit unwinding of the same from said drum; and seat occupant operable release means connected to said holding means and acting upon operation to affect positioning of said holding means so as to allow unwinding of the flexible member from the drum upon application of a forwardly directed load to said apertured link means.

Figure 2:
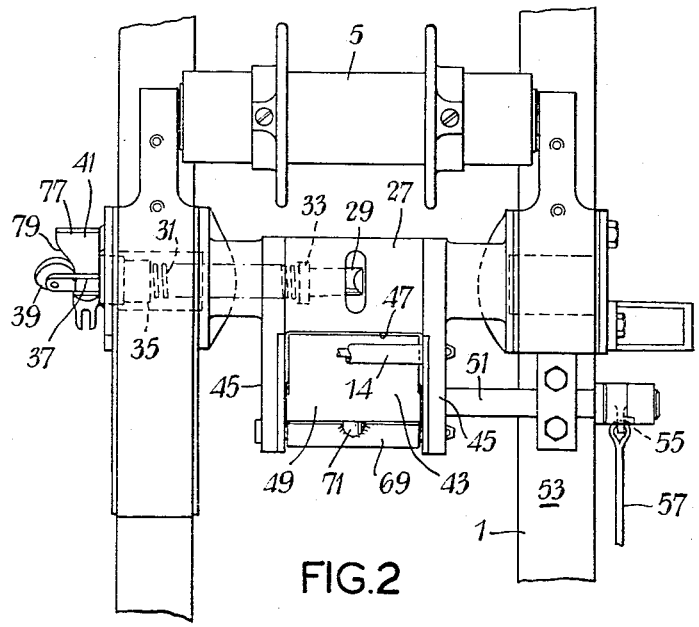
Figure 7:
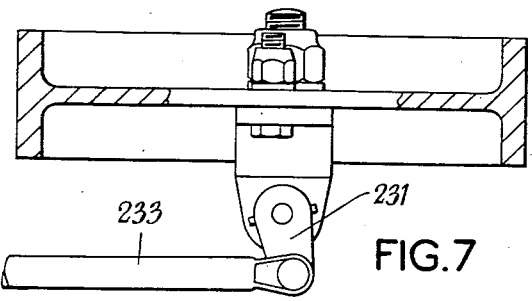
Figures 5, 6:
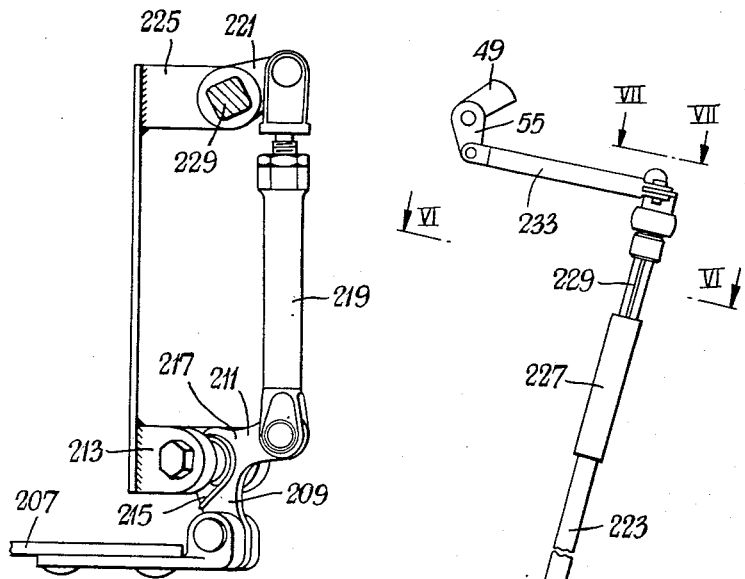
Figure 9:
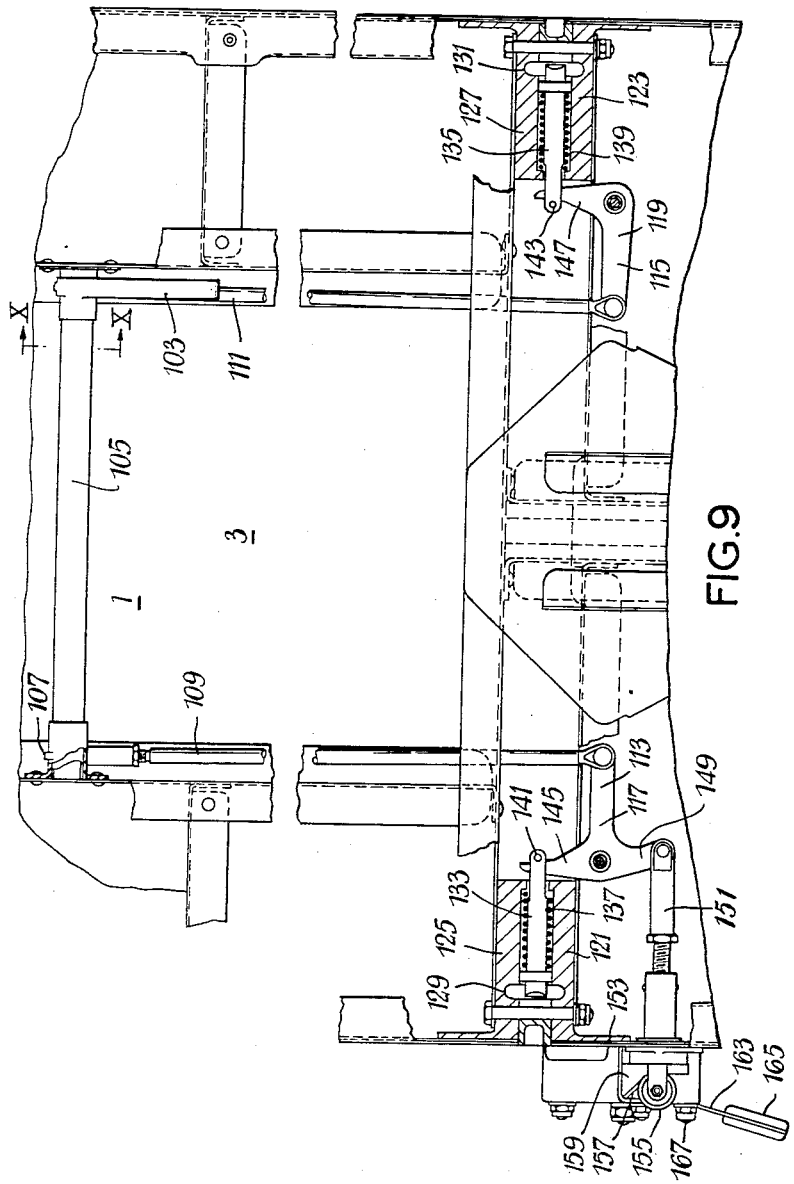

The invention will now be described, by way of example, with reference to the accompanying, somewhat diagrammatic drawings, in which:

Fig. 1 is a fragmentary sectional side elevation of an ejection seat illustrating means for coupling the shoulder straps of the seat harness of an occupant of the seat to the back rest of the seat, Fig. 2 is a front elevation of the coupling means of Fig. 1 certain parts having been omitted, Fig. 3 illustrates a detail of the coupling means of Fig. 1 and Fig. 2, Fig. 4 is a side elevation of the ejection seat illustrating a manually operable lever associated with the coupling means of Figs. 1 to 3, Fig. 5 is a side elevation of an alternative linkage for connecting the coupling means of Figs. 1 to 3 with a manually operable lever, Figs. 6 and 7 are views respectively on the lines VI—VI and VII—VII of Fig. 5, Fig. 8 is a side elevation of the ejection seat taken on the side of the seat opposite to that of Fig. 4 illustrating means whereby the coupling means of Figs. 1 and 2 are released during the ejection sequence, Fig. 9 is a fragmentary elevation of a lower part of the back rest of the ejection seat illustrating harness locks operable in conjunction with the means for releasing the coupling means of Figs. 1 and 2, Fig. 10 is a fragmentary view taken on the line X—X of Fig. 9, Fig. 11 is a side elevation of a manual override lever adapted to effect release both of the seat harness locks and coupling means of Figs. 1 and 2, and Fig. 12 is a view of a detail of Fig. 11.

Referring to Figs. 1 to 4, an ejection seat generally indicated at 1 and of the kind set forth is provided with means for coupling the shoulder straps of the seat harness of an occupant of the seat to a back rest 3 of the seat. The said means include a drum 5 rotatably mounted on a fixed shaft 7 extending transversely of the back rest 3 of the seat at approximately shoulder level. To the drum 5 is secured one end of a webbing strap 9 which is coiled on the drum and the drum is connected internally to one end of a coil spring 11 the opposite end of which is anchored to the shaft 7. The coil spring 11 serves to bias the drum in a sense tending to wind the strap 9 on to the drum. From the drum, the strap 9 extends downwards to and around a roller 13 and forwardly from the roller 13 over a roller 14 to apertured link means in the form of a yoke 15 which is secured at 17 to the shoulder straps of the seat harness of an occupant of the seat, of the type shown in my prior U.S. Patent No. 2,655,329 issued October 13, 1953. The strap 9 passes through and around a rear pulley member 19 of the yoke 15 and continues rearwardly from the yoke towards the seat. At its end remote from the drum, the strap 9 is secured to an apertured lug 21 (see Fig. 3) which includes a forward apertured part 23 with which the strap is connected and a rear apertured part 25 normally to the part 23 and adapted for insertion into an aperture 26 of a housing or beam 27 mounted transversely on the backrest 3 of the seat 1.

Within the housing 27 is mounted a bolt 29 which is adapted to engage within the rear apertured part 25 of the lug 21 thereby retaining the lug in the housing 27. The bolt 29 is spring biassed towards the aperture 26 of the housing by a helical spring 31 disposed around the bolt 29 and acting between a shoulder 33 on the bolt and a shoulder 35 provided in the housing. At its inner end, that is to say the end adjacent the aperture 25, the bolt 29 is chamfered to facilitate insertion and withdrawal of the apertured lug whilst, at its outer end, the bolt 29 projects beyond the side of the seat and is formed with a slot 37. To this end, the bolt 29 is bifurcated and a roller 39 is rotatably mounted between the bifurcations to provide the rear boundary of the slot 37. Within the slot are provided bolt displacing means 41 described below and adapted to move relatively to the slot 37 and thereby to effect movement of the bolt 29 against its biassing spring 31 to withdraw the bolt from the apertured lug 21.

Between the roller 13 and the yoke 15, the strap 9 passes through a clamping means 43 which is mounted between parallel side plates 45 extending downwardly from the housing 27. The clamping means comprise a fixed plate 47 provided on the underside of the housing 27 and a movable cam plate 49 which is keyed to a shaft 51 which is mounted in bearings provided in the side plates 45 and projects outwardly through an upright side member 53 of the seat. Outwardly of the side member 53, the shaft 51 is provided with a crank arm 55 to the end of which remote from the shaft 51 is secured a cable 57 which passes downwardly to and around a roller 59 and thence forwardly to a box 61 within which it is secured to one end of a pivotally mounted lever 63 the opposite end of which terminates in a knob 65. The cam plate 49 is spring biassed towards the fixed plate 47. To this end, on a spindle 67 mounted between the side plates 45 is provided a sleeve 69 formed with a hollow stub member 71 which extends normally to the sleeve 69. Telescopically arranged within the stub member 71 is a link 73 secured at the end thereof remote from the member 71 to the cam plate 40 and a spring 75 is provided in the stub member 71 which acts between the sleeve 69 and the link 73 thereby biassing the cam plate 40 towards the fixed plate 47.

Normally, the spring 75 urges the cam plate toward the fixed plate 47 and it will be appreciated that when a forwardly directed load is applied to the yoke 15 the cam plate 49 will rotate slightly so as to effect tighter clamping of the strap 9. When the occupant of the seat wishes to lean forward he pulls the knob 65 of the lever 63 rearwardly thereby applying a tension to the cable 57 which causes the arm 55 to rotate the shaft 51 so as to effect movement of the cam plate 49 away from the fixed plate 47. The movement of the cam plate 49 allows the strap 9 to move forwardly when a forwardly directed load is applied to the yoke 15. As the forwardly directed load is relieved an as the knob 65 is release the coil spring 11 acts on the drum 5 to wind the strap 9 back on the drum. Suitably, opposed surfaces of the cam plate 49 and the fixed plate 47 are serrated to effect greater gripping of the strap 9.

An alternative linkage to the lever 63 and 57 for moving the cam plate 49 is shown in Figs. 5 to 7 in which a manually operable lever 201 pivotally mounted at an end 203 on the side of the seat and having at the opposite end an operating handle 205 is connected intermediate its ends with one end of a link 207, the opposite end of which is pinned to an arm 209 of a bell crank lever 211 which is pivotally mounted in a bracket 213 secured to the back rest of the seat. The bell crank lever 211 is biassed by means of a spring 215 so as to urge the link 207 to the right as seen in Figs. 5 and 6. On an arm 217 of the bell crank lever 211 is pinned one end of a rod 219 to the opposite end of which is pinned an end of a link 221, the opposite end of which is keyed to an end of an upright hollow shaft 223 projecting below a bearing bracket 225 for the shaft 223, the bracket 225 being fixed to the back of the seat. At its upper end the shaft 223 is provided with a part 227 within which is telescopically fitted a rod 229 of substantially square cross-section, the part 227 having a bore complementary with the rod 229. At its upper end the rod 229 is keyed to a link 231 which is connected with one end of a member 233 to the opposite end of which is pinned the crank arm 55 associated with the cam plate 49.

When the seat occupant moves the handle 205 of the lever 201 forwardly, the link 207 moves downwardly and forwardly and rotates the bell crank lever 211 against its biassing spring 215. The rotation of the bell crank lever 211 causes the rod 219 and link 221 to rotate the shaft 223 in a clockwise sense as seen in Fig. 6 and this rotation is transmitted through the part 227 to the rod 229. The rotation of the rod 229 is accompanied by rotation of the link 231 and movement to the left as seen in Figs. 6 and 7 of the member 233. This movement of the member 233 effects rotation of the shaft on which the crank arm 55 is mounted and movement of the cam plate 49 to release the strap 9 is thereby caused. On release of the handle 205, the biassing spring 215 returns the linkage to its original position.

The bolt displacing means 41 referred to above include a wedge-shaped sear 77 disposed within the slot 37 and having an inclined surface 79 which engages the roller 39. As shown in Fig. 8 the sear 77 is mounted on a rod 81 which is pinned to a lever member 83 intermediate the ends of that member and the lever member is pivotally mounted at one end on a side of the seat. An end of the lever member 83 remote from the pivotal mounting thereof is disposed in the path of a force applying means which comprises an element (not shown) which is disposed within a housing 87 for a time delay mechanism which is set in operation as the seat leaves the aircraft, for instance by the engagement of an actuating element of the time delay mechanism with a projection situated on a fixed part of the aircraft. Thereafter, at an appointed time in the ejection sequence, the said element is released and projected downwardly, for example, by spring means incorporated in the time delay mechanism, to strike and thereby rotate the lever member 83 so as to effect downward movement of the sear 77 relative to the slot 37 which in turn causes the bolt 29 to move against its biassing spring 31 and become disengaged from the apertured lug 21.

According to a feature of the invention this connection between the bolt 29 and the apertured lug 21 is arranged to occur with unlocking of the seat harness locks. Therefore, pinned to lever member 83 is a downwardly extending rod 89 which at its lower end is pinned to a rod 91 which is arranged to move about centres 93 and 95 for which purpose the rod 91 is connected at opposite ends thereof with respective radius arms 97 and 99. Towards a lower end of the rod 91 there is provided a sleeve 101 to which is pinned a cranked lever 103. Intermediate its ends, as shown in Fig. 9 and Fig. 10, the cranked lever 103 is keyed to a shaft 105 which is rotatably mounted transversely in the back of the seat. On an end of the shaft 105 remote from the lever 103 is provided a further crank 107 to which and to the forward end of the cranked lever 103 are connected respective arms 109 and 111 which extend downwardly alongside the back rest 3 of the seat and are pinned at the lower ends thereof to respective parts 113 and 115 of bell crank levers 117 and 119 which are pivotally mounted on the back of the seat and are adapted to operate respective seat harness locks 121 and 123. The seat harness locks 121 and 123 each include housings 125 and 127 formed with apertures 129 and 131 and within which are disposed bolts 133 and 135 extending in opposite directions and respectively biassed by helical springs 137 an 139 which each act between a shoulder provided on the corresponding bolt and a shoulder formed within the associated housing. The bolts 133 and 135 are adapted to engage within ring fittings as shown in Figs. 4, 8 and 9 of my said prior U.S. Patent No. 2,655,329 provided on straps of the seat harness and to facilitate locking of the ring fittings on to the bolts and release of the ring fittings from the bolts, the bolts 133 and 135 are chamfered at their outer ends. At their inner ends the bolts 133 and 135 are bifurcated and rollers are mounted on transverse spindles 141 and 143 between the bifurcations respectively of the bolts 133 and 135 to form slots in the bolts within which respective parts 145 and 147 of the bell crank levers 117 and 119 engage.

The bell crank lever 117 is formed with an extension arm 149 which is pinned to a member 151 which extends transversely through a side 153 of the back rest 3 of the seat. The member 151 is spring biassed in known manner in a sense tending to maintain the associated bolt 133 in its locked position and at its outer end the member 151 is bifurcated and a roller 155 is mounted between the bifurcations. Between the bifurcation of the member 151 extends as is shown in Figs. 11 and 12 a wedge-shaped sear 159 an inclined surface 157 of which engages the roller 155 which facilitates movement of the sear 159 relative to the member 151.

The sear 159 is mounted on a rod 161 which is pinned to one end of a manual override lever 163 the opposite end of which terminates in a handle 165 and which is pivotally mounted on the side 153 of the seat at 167. Rotation of the lever 163 to the position indicated by the broken lines in Figure 11 effects movement of the sear 159 relative to the roller 155 until the roller becomes seated in a recess 169 formed in the sear. During this movement of the sear 159, the member 151 is moved and rotates the bell crank lever 117 in a clockwise sense as seen in Fig. 9.

During the ejection sequence, at a predetermined time, the element within the housing 87 is projected downwardly and strikes the lever member 83 and rotates that member to effect movement of the sear 77 and consequent disconnection of the bolt 29 from the apertured lug 21, thereby freeing the strap 9 which, as the occupant of the seat separates from the seat, passes through the yoke 15 thereby disconnecting the shoulder straps of the seat harness of the seat occupant from the seat. The rotation of the lever member 83 also effects downward movement of the rod 89 and downward and rearward movement of the rod 91 which latter movement causes the cranked lever 103 to rotate counterclockwise, as seen in Fig. 8. The rotation of the lever 103 thus rotates the shaft 105 causing downward movement of the arms 109 and 111 which rotate the bell crank levers 117 and 119 thereby moving the bolts 133 and 135 out of engagement with the associated ring fittings of the seat harness to disconnect and permit separation of the remainder of the seat harness from the seat.

When the seat occupant wishes to disengage himself and the seat harness from the seat at a time other than during the ejection sequence, the seat occupant moves the manual override lever 163 to the position shown by the broken lines in Fig. 11. This movement of the lever 163 causes movement of the member 151 which rotates the bell crank 117 in a clockwise sense as seen in Fig. 9 to disconnect the bolt 133 from its associated seat harness ring fitting. This rotation of the bell crank 117 moves the arm 109 and crank 107 thereby rotating the shaft 105 and the cranked lever 103. The movement of the cranked lever 103 so caused, effects downward movement of the arm 111 and, therefore, rotation of the bell crank 115 which in turn moves the bolt 135 out of engagement with the associated ring fitting of the seat harness. The rotational movement of the cranked lever 103 also moves the rod 91 downwardly and rearwardly and the rod 89 downwardly and this movement of the rod 89 rotates the lever member 83 thereby causing movement of the sear 77 which in turn moves the bolt 29 out of engagement with the lug 21. Thus, operation of the manual override lever effects disconnection between the seat and all parts of the seat harness.

The invention therefore provides an ejection seat in which the means for attaching the seat occupant to the seat are readily adjustable and releasable to release the seat occupant from the seat.

I claim:

1. An aircraft ejection seat of the kind set forth, having means for coupling a seat harness of an occupant of the seat to the seat, such means comprising: a rotatable drum mounted on the seat; a flexible member wound on said drum and having a first end connected to the latter; spring means connecting said drum to the seat and tending to rotate the drum to wind the flexible member on to the latter; apertured link means on said seat harness, the second end of said flexible member extending forwardly from the drum and passing freely through said apertured link means and thence rearwardly to the seat; locking means on the seat for releasably securing said second end of the flexible member to the seat; release mechanism connected to said locking means for actuating the latter to release the flexible member therefrom; holding means on said seat engaging said flexible member to inhibit unwinding of the same from said drum; and seat occupant operable release means connected to said holding means and acting upon operation to effect positioning of said holding means so as to allow unwinding of the flexible member from the drum upon application of a forwardly directed load to said apertured link means.

2. In an aircraft ejection seat of the kind set forth and including seat harness for securing an occupant of said seat in the latter, means for coupling said seat harness to the seat, such means comprising: a rotatable drum mounted on the seat; a flexible member wound on said drum and having a first end connected to the latter; spring means connecting said drum to the seat and tending to rotate the drum to wind the flexible member on to the latter; apertured link means on said seat harness, the second end of said flexible member extending forwardly from the drum and passing freely through said apertured link means and thence rearwardly to the seat; locking means on the seat for releasably securing said second end of the flexible member of the seat; release mechanism connected to said locking means for actuating the latter to release the flexible member therefrom; holding means on said seat engaging said flexible member to inhibit unwinding of the same from said drum; and seat occupant operable release means connected to said holding means and acting upon operation to effect positioning of said holding means so as to allow unwinding of the flexible member from the drum upon application of a forwardly directed load to said apertured link means.

3. An aircraft ejection seat of the kind set forth and including: seat harness for securing an occupant of said seat in the latter; shoulder straps on said seat harness; locking elements on said seat harness; seat harness locks on said seat for the reception of said locking elements; and means for coupling the shoulder straps of said seat harness to the seat, said means comprising: a rotatable drum mounted on the seat; a flexible member wound on said drum and having a first end connected to the latter; spring means connecting said drum to the seat and tendings to rotate the drum to wind the flexible member on to the latter; apertured link means on said shoulder straps, the second end of said flexible member extending forwardly from the drum and passing freely through said apertured link means and thence rearwardly to the seat; locking means on said seat for releasably securing said second end of the flexible member to the seat; release mechanism connected both to said locking means and to said seat harness locks and operable to release said locking means and seat harness locks simultaneously; holding means on said seat engaging said flexible member to inhibit unwinding of the same from said drum; and seat occupant operable release means connected to said holding means and acting upon operation to effect positioning of said holding means so as to allow unwinding of the flexible member from the drum upon application of a forwardly directed load to said apertured link means.

References Cited in the file of this patent

UNITED STATES PATENTS

| 2,394,523 | Pancoe | Feb. 5, 1946 |
| 2,638,293 | Lindstrom | May 12, 1953 |

FOREIGN PATENTS

| 538,142 | Belgium | May 31, 1955 |